United States Patent [19]

van Soest

[11] 4,204,582
[45] May 27, 1980

[54] WHEEL CONVERSION KIT FOR SNOW VEHICLE

[76] Inventor: Gerrit J. van Soest, 555 Yorston St., Williams Lake, British Columbia, Canada, V2G 1H3

[21] Appl. No.: 892,336

[22] Filed: Mar. 31, 1978

[30] Foreign Application Priority Data

Apr. 5, 1977 [GB] United Kingdom ............... 14280/77

[51] Int. Cl.² ............................................ B62M 27/02
[52] U.S. Cl. ............................... 180/183; 180/9.2 C; 280/7.12
[58] Field of Search ............. 180/9.2 C, 9.26, 9.28, 180/9.3, 6.7, 5 R, 5 A; 280/7.12, 7.13, 7.14, 96.1, 660, 661

[56] References Cited

U.S. PATENT DOCUMENTS

| | | | |
|---|---|---|---|
| 2,355,234 | 8/1944 | Nickles | 180/6.7 |
| 3,357,661 | 12/1967 | Aakjar | 280/661 |
| 3,480,096 | 11/1969 | Hammitt | 180/9.3 |
| 3,521,717 | 7/1970 | Coons | 180/5 R |
| 3,664,447 | 5/1972 | Kane | 180/9.3 |
| 3,774,706 | 11/1973 | Kiekhaefer | 180/5 R |
| 4,069,883 | 1/1978 | Cousineau | 180/9.2 C |
| 4,082,155 | 4/1978 | McCartney | 180/5 R |

Primary Examiner—John J. Love
Assistant Examiner—John A. Carroll
Attorney, Agent, or Firm—Carver and Company

[57] ABSTRACT

Conversion kit for converting a snow vehicle into a wheeled vehicle in which the snow vehicle has a transverse beam adjacent the front of the vehicle body. Skis on ski pivots adjacent the front and a powered track assembly adjacent the rear of the vehicle are removed from the snow vehicle and the kit substituted. The kit includes a front axle assembly for mounting a pair of steerable front wheels, and a rear axle assembly adapted to be powered for mounting a pair of rear wheels. The kit also includes front axle mounting structure adapted to be secured to the transverse beam and to mount the front axle assembly on the body, which structure includes at least one axle bracket having a pair of flanges. The flanges straddle the front axle assembly to receive an axle attaching bolt passing through the flanges and the front axle assembly to secure the front axle assembly to the axle bracket.

15 Claims, 11 Drawing Figures

WHEEL CONVERSION KIT FOR SNOW VEHICLE

BACKGROUND OF THE INVENTION

1. Field of the Invention

The invention relates to a front and rear axle conversion kit with associated steering and drive means which can be easily substituted for skis and drive belt of a conventional recreational snow vehicle.

2. Prior Art

Common recreational snow vehicles have a pair of steerable skis at the front and a cleated drive belt or powered track assembly at the rear and are relatively expensive investments. In many parts of the world, such vehicles can be used for only a few months of the year and it is known to remove the front skis and track assembly thereof and substitute road wheels. Commonly this substitution involves considerable modification to the existing snow vehicle, is time consuming and expensive, and results in a vehicle that is unsuitable for some applications, has poor road holding ability and is generally a poor design compromise.

SUMMARY OF THE INVENTION

The present invention reduces some of the difficulties and disadvantages of the prior art by providing a conversion kit of relatively low cost that can be fitted to an existing snow vehicle in a relatively short time after minimal permanent modification of the snow vehicle, which modification includes mainly drilling holes for attachment and clearance purposes.

A conversion kit for converting a snow vehicle into a wheeled vehicle includes a front axle assembly for mounting a pair of steerable front wheels and a rear axle assembly for mounting a pair of rear wheels. The kit also has front axle mounting means including at least one pair of axle brackets characterized by a pair of members spaced apart sufficiently to straddle the front axle assembly and adapted for securing rigidly the front axle assembly to the axle bracket. The axle bracket is also characterized by a securing shaft means extending from the axle bracket and adapted to pass directly through generally vertical ski pivot openings in a transverse beam adjacent the front of the snow vehicle, and releasable securing means to secure the securing shaft means rigidly to the transverse beam.

The method of converting the snow vehicle into a wheeled vehicle is characterized by a series of steps as follows. The ski pivots and skis and power track assembly are removed from the snow vehicle. Securing shaft means of a front axle mounting means are inserted into ski pivot openings of a transverse beam adjacent the front of the vehicle. The front axle mounting means includes at least one axle bracket having two members spaced apart sufficiently to accept a front axle assembly therebetween. The front axle mounting means is secured rigidly to the transverse beam and the front axle assembly is fitted between the two spaced members and secured rigidly to the mounting means. Steerable front wheels are connected to steering column means of the vehicle to provide means to steer the front wheels. Rear axle mounting means are secured to the vehicle adjacent the rear of the vehicle and drive means are connected from output drive means of the vehicle to the rear axle.

A detailed disclosure following, relating to drawings, describes a preferred apparatus and method of the invention which is capable of expression in apparatus and method other than those particularly described and illustrated.

DESCRIPTION OF THE DRAWINGS

FIG. 3 is an exploded fragmented perspective view of a right hand side portion of a front axle assembly according to the invention.

DETAILED DISCLOSURE

Figure 1:
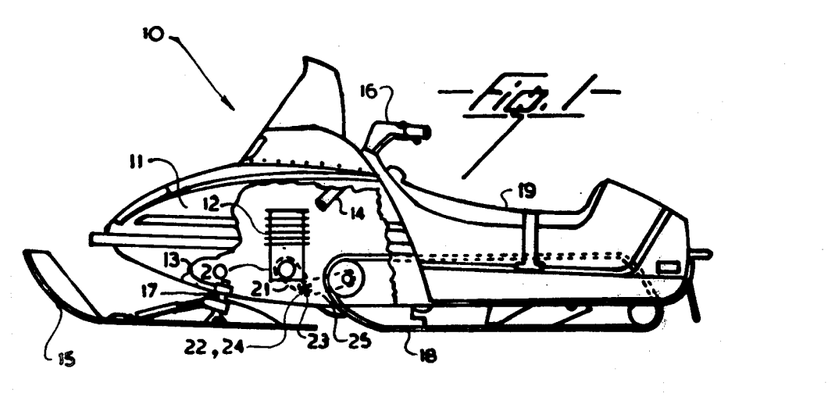
FIG. 1 is a simplified fragmented side elevation of a snow vehicle prior to conversion, some portions being removed for simplicity and to show interior construction.
Figure 2:
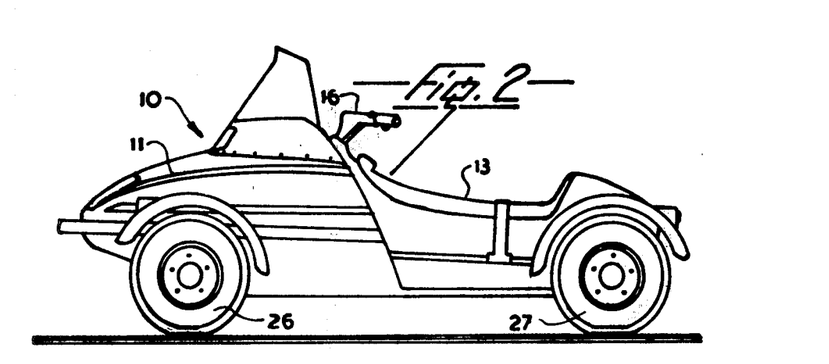
FIG. 2 is a simplified side elevation of the snow vehicle after conversion fitted with a wheel kit according to the invention.

FIGS. 1 and 2

Referring to FIG. 1, a conventional snow vehicle 10 has a body 11 having an engine 12 and a transverse beam 13 extending internally across the body adjacent the front thereof. The vehicle has a pair of steerable skis 15 swivellably mounted adjacent ends of the transverse beam near the front of the vehicle, one ski being shown mounted on a ski pivot 17 journalled in the beam 13, the skis being controlled by handle bars 16 mounted on a steering column 14. A cleated main drive belt or powered track assembly 18 extends rearwards from the skis to power the vehicle and carry much of the vehicle weight, a driver, not shown, sitting on a seat 19 to operate the controls. The engine powers a variable speed pulley combination 20 and 22 carrying a V-belt 21 which drives a shaft 23 carrying a sprocket 24. A main drive chain 25 runs on the sprocket 24 and powers the main drive belt 18. Thus the vehicle has a steering control means adapted to steer skis mounted on the pivots adjacent the front of the vehicle, an engine and an output drive means, and controls for the engine and output drive means for powering a track assembly adjacent the rear of the vehicle.

Referring to FIG. 2, as will be described in greater detail, to convert the snow vehicle to a wheeled vehicle, the skis 15, the pivots 17 and the drive belt 18 are removed and four road wheels substituted, one front wheel 26 and one rear wheel 27 only being shown.

Figures 3, 10:
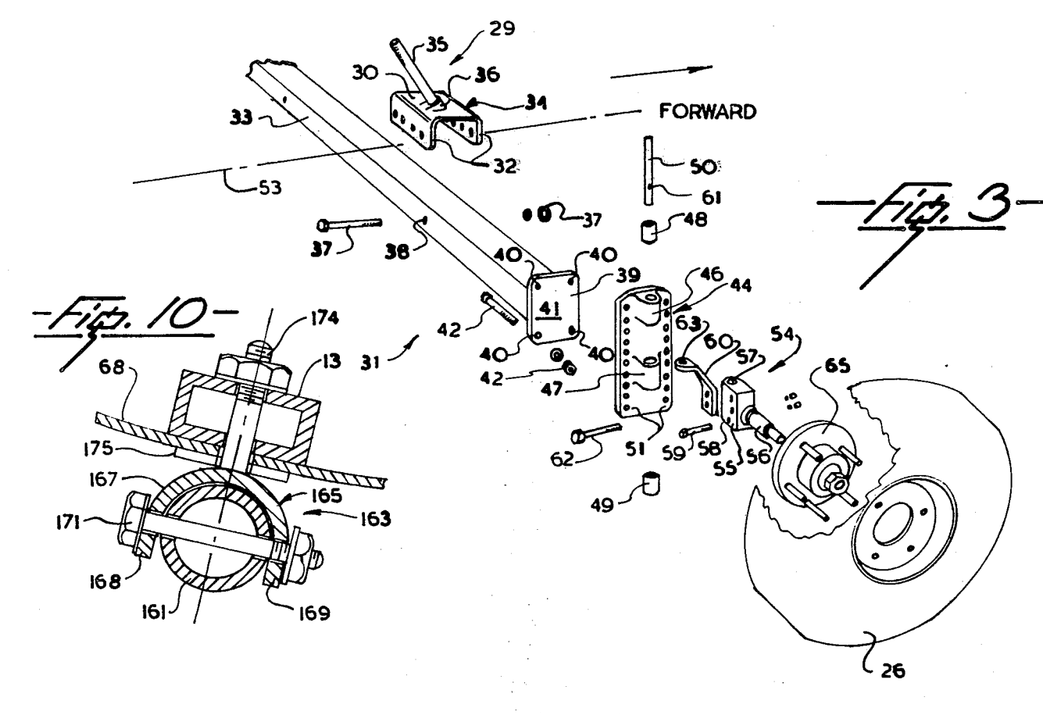

FIG. 3

The invention particularly relates to a front axle mounting means 29 which secures a front axle assembly 31 to the body 11, not shown. The assembly 31 includes a front axle beam 33 which mounts the wheels 26 for steering. The means 29 includes two axle brackets 34, one only being shown, which brackets are secured to the body 11 as follows. The bracket 34 has an intermediate portion 30 and a pair of parallel flanges 32, and an upwardly and rearwardly inclined stud 35 extending from a wedge-shaped boss 36 on the intermediate portion, which boss inclines the stud as needed. The stud passes through existing openings in the body and the beam 13 of the vehicle and is secured thereto as will be described with reference to FIGS. 4 and 5. The bracket 34 is secured to the axle beam 33 by nut and bolt means 37 passing through aligned openings in the flanges 32 which are aligned with an opening 38 in the beam 33. The second axle bracket, not shown but similar to the bracket 34, is secured similarly to the beam 33 adjacent the left hand end thereof. Each bracket has flanges with several openings aligned with openings in the opposite flanges to accept the respective bolt therein to permit adjustment of lateral spacing of the studs to accommodate different vehicle bodies as will be described.

Figures 8, 9, 11:
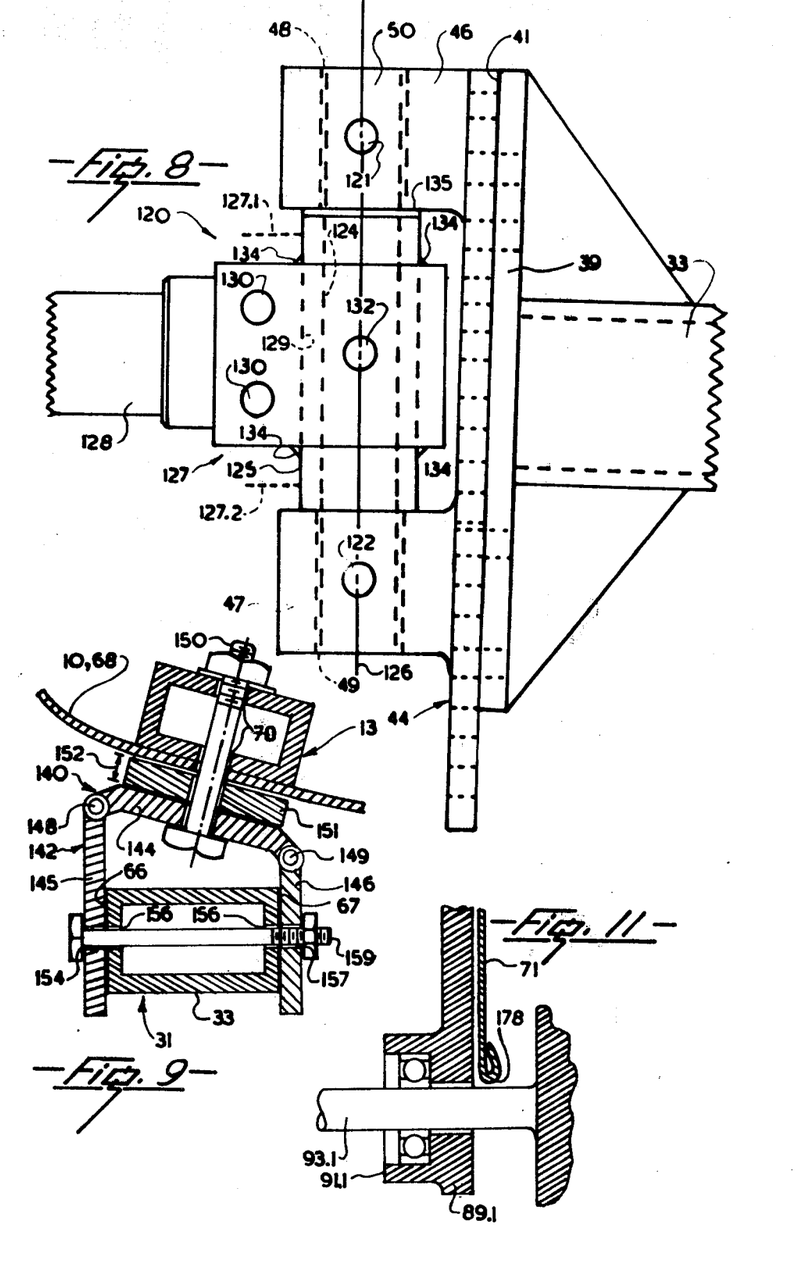
FIG. 8 is a simplified fragmented front elevation of a portion of an alternative steering assembly according to the invention.
FIG. 9 is a simplified fragmented section similar to FIG. 5 showing a first alternative front axle mounting means, FIG. 10 which appears on sheet 2 of the drawings, is a simplified fragmented section similar to FIG. 5 showing a portion of an alternative front axle assembly and mounting means thereof.
FIG. 11 is a simplified fragmented section through a portion of the alternative rear axle mounting means, as would be seen from line 11—11 of FIG. 6.

Both outer ends of the axle beam carry a similar end plate 39, one only being shown. The plate 39 has an outer face 41 and four openings 40 at corners thereof to receive four similar nut and bolt means 42, one such means only being shown. A king pin bearing plate 44 carries upper and lower king pin bosses 46 and 47 having respective king pin bushings or bearings 48 and 49 to journal a king pin 50 therein. Plugs, not shown, to seal outer ends of the bearings can be fitted in the bushings if desired. The king pin bearing plate has a plurality of openings 51 disposed in two parallel vertical columns on each side thereof, the openings being spaced apart vertically and horizontally to correspond with complementary spacings of the openings 40 in the plate 39. Thus by suitable selection of four of the openings 51 to correspond with the four openings 40, four nut and bolt means 42 can secure the king pin assembly adjacent the outer face 41 to ends of the axle beam 33 at a particular height as required by the body size. This permits a relatively coarse adjustment of height of the king pin assembly relative to the axle beam to select a particular stub axle height. Thus the nut and bolt means and the plurality of openings in the bracket 34 and the bearing plate 44 serve as securing means to permit vertical adjustment of the king pin bearing plate and thus permits use of the same king pin assembly and axle beam to fit several different types of snow vehicle bodies. Increments of adjustment for stub axle height are dependent on vertical spacing between the openings 51, typically about 1 cm. An alternative fine adjustment means which can also be incorporated is shown in FIG. 8.

Thus the assembly 31 includes a pair of generally similar end plates 39, the end plates being fitted adjacent ends of the axle beam 33 and having outer faces 41 disposed generally vertically and generally parallel to a plane containing a longitudinal axis 53 of the vehicle. The term "generally vertically" herein and in the claims includes shallow angles of inclination to the vertical which provide camber and other design angles of the king pins necessary for acceptable steering performance. The assembly 31 also includes a pair of king pin bearing plates 44 having pairs of aligned king pin bearings 48 and 49, the bearing plates having securing means to secure the bearing plates 44 to the end plates of the axle assembly, the securing means permitting generally vertical adjustment of the king pin bearing plate.

A stub axle means 54 has a stub axle boss 55 and a stub axle 56 extending therefrom, the boss having a generally vertical bore 57 to accept the king pin therein. A cotter pin means such as a bolt 59 passes through a transverse opening 58 in the means 54 which opening intersects the bore 57. The cotter pin engages a groove 61 on the pin 50 to prevent relative movement between the stub axle means about the king pin, and other means to prevent relative movement can be substituted. A steering arm 60 is bolted to the boss by two nut and bolt means 62, one only being shown, which arm has an opening 63 at an outer end to connect with a steering link as will be described. A front wheel hub 65 is journalled on the stub axle 56 and carries the front wheel 26 as is common practice. The stub axle means thus has a king pin adapted to be journalled in the king pin bearing, and a stub axle to mount a front wheel thereon, so as to permit swivelling of the front wheel for steering purposes.

Figure 4:
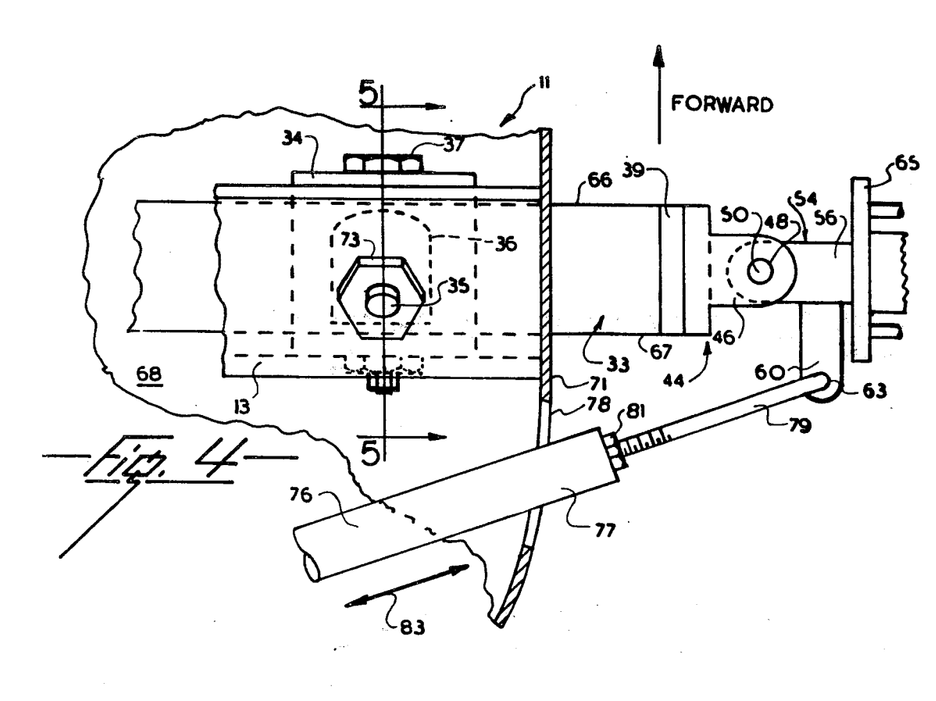
FIG. 4 is a simplified fragmented top plan of the right hand side portion of the front axle assembly shown fitted to an adjacent portion of the vehicle body.
Figure 5:
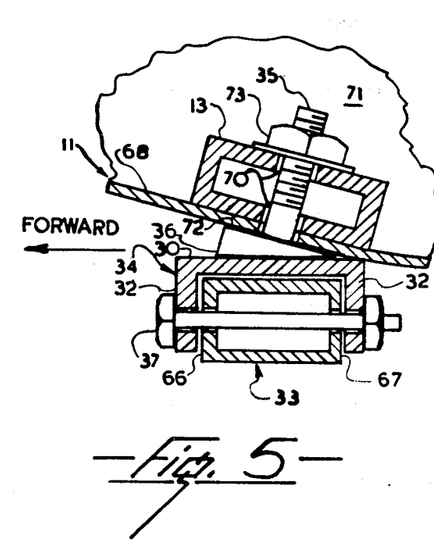
FIG. 5 is a simplified fragmented section on line 5—5 of FIG. 4, showing front axle mounting means securing the front axle assembly to the body.

FIGS. 4 and 5

The body 11 has a lower panel 68 curved upwardly towards the front of the vehicle, the transverse beam 13 extending between side panels of the snow vehicle, a right hand side panel being designated 71. The stud 35 extends upwardly and rearwardly from the bracket 34, and passes normally through an opening 70 in the beam 13 and is secured to the beam by a nut 73. As previously stated, the opening 70 in the beam 13 is already provided and normally journals a ski pivot, designated 17 in FIG. 1, for mounting the skis for the snow vehicle and thus additional openings in the body or beam 13 are not required. The opposite ski pivot opening, not shown, accepts the opposite stud of the opposite bracket and lateral spacing between the openings 70 is accommodated by selecting appropriate bolt openings in the bracket 34 to accept the means 37. The axle beam 33 has a pair of plane parallel side walls 66 and 67 and the axle bracket 34 has the pair of flanges 32 which are spaced apart sufficiently to accept the side walls 66 and 67 of the axle beam therebetween. The bolt 37 serves as an axle attaching bolt passing through an opening in the beam aligned with openings in the flanges so as to cooperate with the front axle assembly to secure the front axle assembly to the axle bracket.

The wedge-shaped boss 36 of the stud 35 has an upper face 72 parallel to the panel 68, ie. complementary to the angle of inclination of the body local to the transverse beam 13. The boss 36 serves as a filler or location means to prevent movement between the generally horizontal upper face of the portion 30 of the bracket 34 and the inclined lower panel 68, and to cooperate with the bracket to locate the front axle assembly at a desired orientation relative to the vehicle body to obtain desired steering characteristics. An outer portion of the axle beam 33 extends beyond the side panel 71 so that the front wheels straddle the body and clearance is provided for swinging of the wheel 26 mounted on the stub axle unit 54.

A steering link 76 extends from a lower portion of the steering column 14, shown in FIG. 1, which column carries and is rotated by the handle bars 16. The link 76 has an outer end 77 which is normally connected to links, not shown, to swing the skis for steering the snow vehicle, the link passing through a clearance opening 78 in the panel 71. In the present conversion kit, a threaded opening in the outer end 77 accepts a steering link extension 79 which is secured thereto by a locking nut 81, the link extension 79 having an inner end journalled in the opening 63 of the steering arm 60. Thus swinging the handle bars moves the steering link in directions as shown by a double-headed arrow 83, which swings the stub axle to effect steering as in conventional automobile steering. Alternatively, a combination left-hand and right-hand threaded member similarly to a turnbuckle can be fitted to effect adjustment of steering link extension.

Figure 6:
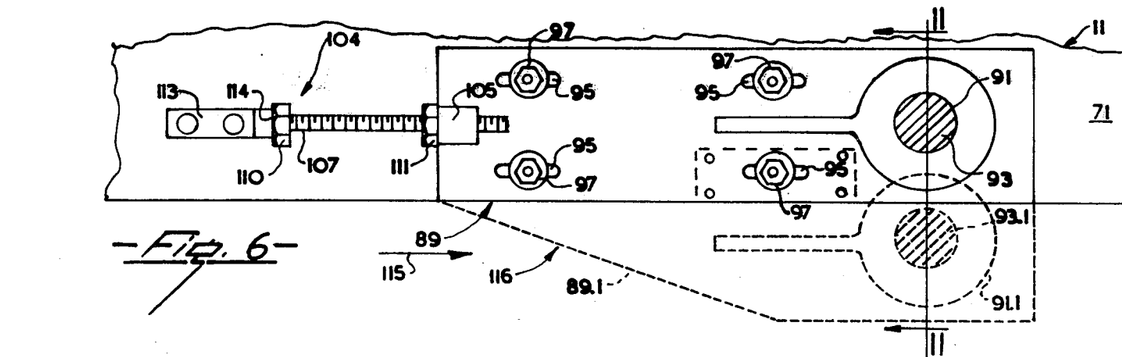
FIG. 6 is a simplified fragmented side elevation showing a right hand side portion of a rear axle and mounting means thereof, as seen from inside the vehicle body, and also showing an alternative mounting means.
Figure 7:
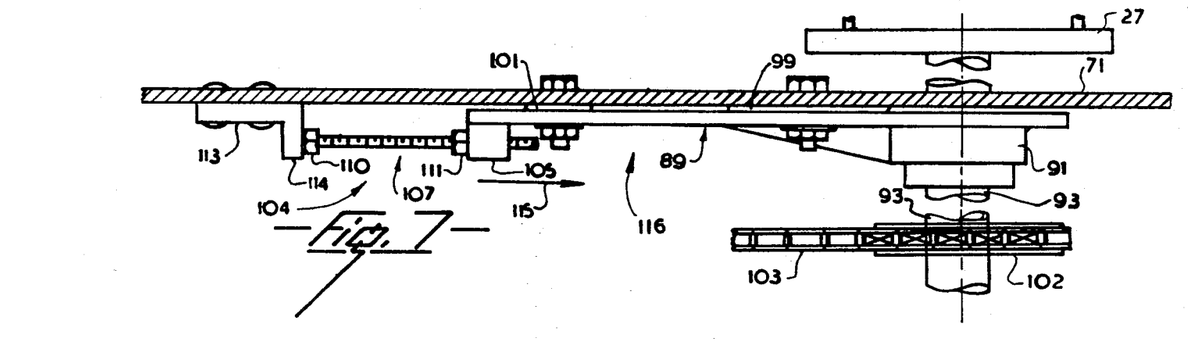
FIG. 7 is a simplified fragmented top plan view of the rear axle mounting means and body portion of FIG. 6.

FIGS. 6 and 7

A rear portion of the right hand panel 71 of the body 11 carries a rear axle bearing plate 89 which has a rear axle bearing 91 for journalling a rear axle 93, the rear wheels 27 being mounted at outer ends of the axle so as to straddle the body, one wheel only being shown. If desired, one rear wheel can free wheel on the rear axle to prevent tyre scuffing. The bearing plate has four oval slots 95 which carry four nut and bolt means 97 which secure the plate 89 to the side panel 71. A reinforcing patch 99 is commonly rivetted to the body to secure portions of the main track assembly thereto when used as a snow vehicle, the patch and body panel having aligned openings which are used for one of the bolts 97, thus eliminating the drilling of one bolt hole, so that only three bolt openings are needed in the panel. A sprocket 102 is carried on the axle 93 and a main drive chain 103 engages the sprocket 102 and the sprocket 24 of the existing snow vehicle drive, as seen only in FIG. 1. It can be seen that fitting the rear axle requires four additional openings in each side panel, namely three openings to accept the three nut and bolt means 97 and a main clearance opening for the axle 91. To prevent distortion of the side panel 71, a spacer 101 of similar thickness to the patch is fitted on the adjacent lower bolt.

A chain tension adjuster 104 includes a threaded boss 105 at a forward end of the plate 89 and a bolt 107 threaded in the boss and having a head 110 and a nut 111. A right angled bracket 113 is rivetted to the panel 71 and has a flange 114 which cooperates with the head 110 of the bolt and the nut 111 locks the bolt in the required position. Thus, when the four nut and bolt means 97 are loosened, it can be seen that rotation of the bolt 107 in a suitable direction pushes the bearing plate 89 rearwards in direction of an arrow 115 to take up slackness in the chain. Thus it can be seen that two of the plates 89 and associated structure serve as a pair of rear axle mounting means 116 securable to the vehicle body adjacent the rear thereof. The mounting means 116 have bearing means for the rear axle and means for moving the bearing means relative to the vehicle body to adjust drive means from the output drive means to the rear axle.

OPERATION

To convert an existing snow vehicle 10 to a wheeled vehicle, the skis 15, the ski pivots 17 and the track assembly 18 are removed from the snow vehicle and openings are drilled in each side panel of the body adjacent the rear of the vehicle to accept the three nut and bolt means 97 for retaining the rear axle bearing plates to each side panel, and also the clearance openings for the rear axle. The two axle brackets 34 are secured to the axle beam 33 by nut and bolt means 37 so that the studs 35 are spaced at the required spacing to be accepted in the openings 70 in the transverse beam 13 that are normally provided for the ski pivots. The axle beam is then secured to the transverse beam by the nuts 73. Each king pin bearing plate 44 is secured to the end plates 39 of the axle beam by the four nut and bolt means 42 so that each stub axle 56 is at the required height for wheel diameter and body size. Each steering link extension 79 is secured to the end of the respective steering link 76 and coupled to the steering arm 60.

The rear axle bearing plates are secured loosely to the side panels with the four nut and bolt means 97 and spacers etc., the rear axle being journalled in the rear axle bearings 91. The main drive chain 103 passes around the sprocket 102 and correct chain tension is adjusted by the tension adjuster 104 after which the nut and bolt means 97 are tightened. The existing brake mechanism and engine controls of the snow vehicle require no adjustment.

ALTERNATIVES AND EQUIVALENTS

FIG. 8

An alternative stub axle means 120 is shown secured to the end of the axle beam 33. The previously described king pin bearing plate 44 is secured to the face 41 of the end plate 39 by nut and bolt means, not shown, and the king pin bushings 48 and 49 in the king pin bosses 46 and 47 journal the king pin 50 as previously described. As in the previously described embodiment, the king pin has an axis of rotation 126 which is inclined at suitable angles of camber, castor and rake for the particular design of vehicle to attain desired steering characteristics, and grease nipple openings 121 and 122 can be provided for lubrication as is common practice.

The stub axle means 120 includes a king pin sleeve 125 having a central bore 124 to accept the king pin 50, and an alternative stub axle boss 127 having a stub axle 128 and a generally vertical bore 129 to receive the sleeve 125. The stub axle boss has openings 130 to receive nut and bolt means, not shown, for securing the steering arm as in the previously described embodiment, and aligned openings 132 extending through the boss and the sleeve can be provided to receive a set screw, not shown, to secure the boss 127 and sleeve 125 to the king pin. The stub axle boss 127 is secured to the king pin sleeve by welds 134 at upper and lower ends thereof, axial location of the stub axle boss on the sleeve being determined by particular vehicle requirements. Clearly the boss can be fitted on the sleeve anywhere between extremes of an upper position 127.1, and a lower position 127.2, which thus provides fine adjustment for the particular location of the stub axle relative to end faces of the sleeve. Thus, at the assembly level in the factory, the stub axle can be secured by welding to, or other means cooperating with, the sleeve at a particular location or height as required for a particular vehicle make and model, which, when combined with the coarse adjustment provided by the opening 51 in the bearing plate 44, provides an effective fine adjustment for a wide range of stub axle heights. A ball thrust bearing 135 can be fitted between the sleeve 125 and the king pin boss 46 to reduce friction losses. Means other than welding and set screws can be substituted to cooperate with the stub axle boss, the king pin and sleeve to locate the stub axle at a desired location relative to the king pin.

FIG. 9

An alternative front axle mounting means 140 is similarly adapted to be secured to the transverse beam 13 to mount the front axle assembly 31 to the body. The means 140 includes an alternative axle bracket 142 having an intermediate portion 144 and two flanges 145 and 146. The flanges 145 and 146 are hinged to the intermediate portion on hinge pins 148 and 149 respectively so as to permit relative swinging therebetween about undesignated axes disposed transversely to the vehicle body, that is parallel to the transverse beam 13. The intermediate portion 144 is secured to the body 11 by a bolt 150 passing through the opening 70 in the beam 13 with a parallel-sided spacer 151 fitted between the lower panel 68 and the intermediate portion 144 of the axle bracket. The spacer has a thickness 152 which is selected to position the bracket 142 at a required location relative to the lower panel 68. Thus, the bolt 150 secures the axle bracket 142 to the body by passing through aligned openings in the intermediate portion 144, the spacer 151, the panel 68 and the beam 13. The bolt 150 or an alternative threaded shaft secured to the bracket thus cooperates with the intermediate portion to pass through a complementary opening or openings in the transverse beam to secure the front axle mounting means to the vehicle, thus serving as an attachment means to secure the front axle mounting means to the transverse beam and is equivalent to the stud 35 of FIG. 3.

The flanges 145 and 146 hang freely from the portion 144 and are spaced apart sufficiently to accept the side walls 66 and 67 of the front axle assembly 31 therebetween. Thus, the hinge pins freely journal the flanges and when the bracket 142 is secured to the body and the body is located in an operative attitude, the flanges hang vertically downwards under gravity from the intermediate portion and are generally parallel to each other so as to accept the plane parallel sides of the axle beam 33 therebetween. The axle beam is designed so that when the king pins of the end plates, not shown, are disposed in a desired orientation, the side walls of the beam 33 are vertical and thus are parallel to the flanges. Thus it can be seen that clamping the flanges to the axle beam with G-clamps, not shown, automatically locates the axle beam in the correct orientation relative to the body to attain desired steering characteristics. Preferably one of the flanges, for example the flange 145, has a previously drilled opening 154 which is used as a pilot hole or guide for drilling openings 156 through the beam 33, and an aligned opening 157 through the flange 146 to accept an axle attaching bolt 159. The bolt 159 passes through the aligned openings and with a nut and washer secures the axle to the axle bracket similarly to the bolt 37 of FIGS. 3 and 5. Usually two axle brackets are used, one adjacent each side panel of the body.

Thus, it can be seen that by positioning each axle bracket at the correct distance from the panel 68 by selecting suitable spacers, all that is then required is to accurately position the body to be in an operative attitude, mount the axle beam between the freely hanging flanges, clamp the flanges with a pair of G-clamps and then drill the holes through the axle beam and flanges using the pilot holes in the flange to initiate the holes. After the flanges are secured to the beam, lower portions of the flanges projecting below the beam can be sawn off.

Thus, hinging the flanges to the intermediate portion provides a locating means cooperating with the intermediate portion of the axle bracket and the beam for securing the bracket to the beam to obtain desired axle alignment. This accommodates front panels of varying degrees of inclination and height because the flanges hang freely so as to be essentially vertical and a suitable spacer 151 of sufficient width can be selected to attain desired axle height. The lower panels adjacent the beam 13 of most snow vehicles are within a range of about 20 degrees of each other and this range has a negligible effect on spacing between the flanges. This structure provides a more versatile front axle mounting means when compared with the means 29 of FIGS. 3 through 5 and can clearly accommodate vehicle bodies of different shapes and heights. The previously described wedge-shaped boss 36 and the stud 35 of fixed inclination of the mounting means 29 shown in FIGS. 3 through 5 would likely only fit particular snow vehicles having bodies with particularly inclined front portions of the lower panels thereof. Thus several different types of mounting means would be required to handle all the present types of snow vehicles. With the means 140, different body shapes can be accommodated with one bracket and this facilitates stocking of conversion kit parts. Also the holes drilled through the axle beam are positioned to accommodate ski pivot hole spacing in the beam and this eliminates the plurality of holes in the bracket flanges of FIGS. 3 and 5.

FIG. 10

An alternative front axle beam 161 is cylindrical in contrast with the rectangular sectioned beam 33 of FIG. 3, and is secured to the vehicle by an alternative front axle mounting means 163 having two alternative axle brackets 165, one only being shown. The bracket 165 has an intermediate portion 167 having a semi cylindrical inner face complementary to the beam 161 and a pair of parallel flanges 168 and 169 extending generally tangentially and downwardly from the portion 167 and spaced apart to accept the axle beam 161 therebetween as shown. An axle attaching bolt 171 passes through undesignated aligned openings in the flanges and beam 161, with a nut and washer means 173 secures the axle beam to the bracket. A threaded shaft 174 is secured to and extends from the intermediate portion 167 to pass through a washer 175, the panel 68 and transverse beam 13 to secure the axle bracket to the vehicle. The shaft 174 is preferably disposed normally to the bolt 171 and the bracket 176 can accommodate different angles of the beam 13 similarly to the bracket 142 of FIG. 9. Clearly alternate end plates, not shown, are secured to opposite ends of the axle beam 161 and a wide variation in castor angles of the king pins, not shown, is possible with the cylindrical beam 161 which can be rotated relative to the bracket. The semi-cylindrical portion 167 and cylindrical axle beam 161 thus serve as a location means cooperating with the intermediate portion to locate the front axle assembly at a desired orientation relative to the vehicle body. This can result in a more versatile and less costly axle assembly than the previously described embodiments. Alternative attachment means such as a bolt similar to the bolt 150 of FIG. 9 to secure the bracket to the beam 13 are acceptable. It can be seen that the stud 35, the bolt 150 and the shaft 174 are securing shaft means extending from the axle bracket and adapted to pass directly through generally vertical ski pivot openings in the transverse beam adjacent the front of the snow vehicle. Also the corresponding nuts are releasable securing means to secure the securing shaft means rigidly to the transverse beam. The flanges 32, 145, 146, 168 and 169 are all members spaced apart sufficiently to straddle the front axle assembly.

FIGS. 6 and 11

To eliminate drilling of the rear axle clearance opening through the body adjacent the rear of the vehicle, an alternative rear axle bearing plate 89.1 can be substituted for the plate 89 of FIG. 6, a lower portion of the plate 89.1 being shown in broken outline in FIG. 6. The plate 89.1 is essentially the same as the plate 89 apart from the repositioning of the rear axle bearing 91 to a broken outline position 91.1 which locates the rear axle in an alternative lowered position 93.1 so that the axle passes closely beneath a lower edge 161 of the side panel 71 adjacent the rear thereof. In FIG. 11 the lower portion of the alternative bearing plate 89.1 is shown in full outline in which it can be seen that the rear axle is positioned in the alternative position 93.1 and is journalled in bearings 91.1 so as to be clear of the edge 178. For the same vehicle body and wheel size, this lowering of the axle results in a slightly higher position of the body relative to the ground but simplifies modification of the snow vehicle.

I claim:

1. A conversion kit for converting a snow vehicle into a wheeled vehicle, the kit having a front axle assembly for mounting a pair of steerable front wheels and a rear axle assembly for mounting a pair of rear wheels, the kit also having front axle mounting means including at least one axle bracket characterized by:
   (a) a pair of members spaced apart sufficiently to straddle the front axle assembly and adapted for securing rigidly the front axle assembly to the axle bracket,
   (b) securing shaft means extending from the axle bracket and adapted to pass directly through ski pivot openings in a transverse beam adjacent the front of the snow vehicle, and releasable securing means to secure the securing shaft means rigidly to the transverse beam.

2. A conversion kit as claimed in claim 1 in which:
   (a) the front axle assembly has an axle beam having a pair of plane parallel side walls,
   (b) the members of the axle bracket are flanges which extend generally downwardly from the body, have aligned openings therein, and are spaced apart sufficiently to accept the plane parallel side walls of the axle beam therebetween,
   (c) an axle attaching bolt passes through an opening in the axle beam aligned with the openings in the flanges.

3. A conversion kit as claimed in claim 1 in which the vehicle has a body and in which:
   (a) the axle bracket has an intermediate portion and the members are flanges, the flanges extend from the intermediate portion and are spaced apart sufficiently to accept an axle beam of the front axle assembly therebetween, the intermediate portion has the securing shaft means to secure the mounting means to the transverse beam of the vehicle,
   (b) location means cooperate with the intermediate portion to locate the front axle assembly at a desired orientation relative to the body of the vehicle,
   (c) means cooperate with the flanges to secure the axle beam between the flanges.

4. A conversion kit as claimed in claim 3 in which the securing shaft means to secure the front axle mounting means to the transverse beam includes:
   (a) a threaded shaft which cooperates with the intermediate portion to pass through a complementary opening in the transverse beam to secure the front axle mounting means to the vehicle.

5. A conversion kit as claimed in claim 3 in which the location means cooperating with the intermediate portion is characterized by:
   (a) a wedge shaped boss fitted between the intermediate portion and the vehicle body, in which the boss has an upper face complementary to the angle of inclination of the body local to the transverse beam,
   so that the axle assembly is disposed at a desired orientation relative to the vehicle body to obtain desired steering characteristics.

6. A conversion kit as claimed in claim 3 in which:
   (a) the front axle assembly has an axle beam having a pair of plane parallel sides,
   the location means cooperating with the intermediate portion of the axle bracket is characterized by:
   (b) the flanges are hinged to the intermediate portion to permit relative swinging therebetween about axes disposed transversely to the vehicle body,
   so that when the axle bracket is secured to the body and the body is located in an operative attitude, the flanges hang freely downwardly therefrom and are spaced apart sufficiently to accept the plane parallel sides of the axle beam therebetween with the axle assembly disposed at a desired orientation relative to the vehicle body to attain desired steering characteristics.

7. A conversion kit as claimed in claim 6 in which:
   (a) one of the flanges has an opening therein to serve as a guide for drilling a passage through the axle beam and the remaining flange to accept a bolt for securing the flanges to the front axle assembly, thus serving as the means cooperating with the flanges to secure the axle beam between the flanges.

8. A conversion kit as claimed in claim 3 in which:
   (a) the front axle assembly has a cylindrical axle beam,
   and the location means cooperating with the intermediate portion of the axle bracket is characterized by:
   (b) the intermediate portion has a semi-cylindrical inner face complementary to the axle beam to permit rotation of the beam relative to the bracket, and the flanges extend generally tangentially from the intermediate portion.

9. A conversion kit as claimed in claim 1 further including:
   (a) a pair of rear axle mounting means securable to the vehicle body adjacent the rear thereof, in which the mounting means have bearing means for the rear axle and means for moving the bearing means relative to the vehicle body to adjust drive means from output drive means of the vehicle to the rear axle.

10. A conversion kit as claimed in claim 1 in which the front axle assembly includes:
    (a) an axle beam, (b) a pair of generally similar end plates, in which the end plates are fitted adjacent ends of the axle beam, and each end plate has an outer face disposed generally vertically and generally parallel to a plane containing a longitudinal axis of the vehicle, (c) a pair of king pin bearing plates, each king pin bearing plate having a pair of aligned king pin bearings and securing means which secure the bearing plate to the end plate of the axle assembly, in which the securing means permit generally vertical adjustment of the king pin bearing plate, (d) a pair of stub axle means, each stub axle means having a king pin journalled in the king pin bearings and a stub axle mounting a front wheel thereon to permit swivelling of the front wheel for steering purposes.

11. A conversion kit as claimed in claim 10 in which:
(a) one of the plates at each end of the axle beam has a plurality of openings therein, which, with nut and bolt means serve as the securing means to permit generally vertical adjustment of the king pin bearing plate.

12. A conversion kit as claimed in claim 10 in which the stub axle means includes:
(a) a stub axle boss fitted between the king pin bearings and carrying the stub axle which journals the front wheel, the boss having a generally vertical bore,
(b) a king pin sleeve with a central bore receiving the king pin, the sleeve being received in the vertical bore of the stub axle boss, with means cooperating with the stub axle boss, the king pin and the sleeve to locate the stub axle at a desired location relative to the king pin,
(c) the king pin passes through the central bore of the king pin sleeve and is secured to the sleeve, the king pin has ends journalled in the king pin bushings so that the stub axle is at a desired height relative to the vehicle body.

13. A method of converting a snow vehicle into a wheeled vehicle, the method being characterized by steps of:
(a) removing ski pivots and skis, and power track assembly from the snow vehicle,
(b) inserting securing shaft means of a front axle mounting means into ski pivot openings of a transverse beam adjacent the front of the vehicle, the front axle mounting means including at least one axle bracket having two members spaced apart sufficiently to accept a front axle assembly therebetween,
(c) securing rigidly the front axle mounting means to the transverse beam,
(d) fitting the front axle assembly between the two spaced members and securing the front axle assembly rigidly to the front axle mounting means,
(e) connecting steerable front wheels of the front axle assembly to steering column means of the vehicle to provide means to steer the front wheels,
(f) securing rear axle mounting means to the vehicle adjacent the rear of the vehicle and connecting drive means from output drive means of the vehicle to the rear axle.

14. A method as claimed in claim 13 further characterized by steps of:
(a) after fitting the front axle assembly between the spaced members of the axle bracket in a desired position and attitude, drilling through an opening in one of the members, through the axle assembly and through the remaining member to produce three aligned holes to accept an axle attaching bolt,
(b) passing the axle attaching bolt through the three aligned holes to secure the front axle assembly to the axle bracket.

15. A method of converting a snow vehicle as claimed in claim 14 wherein the members are flanges freely hinged to an intermediate portion of the axle bracket to permit relative swinging therebetween about axes disposed transversely to the vehicle body,
(a) setting the vehicle body in an appropriate attitude so that the flanges hang generally vertically downwardly from the intermediate portion so as to accept the axle beam therebetween,
(b) positioning the axle beam so as to be in its desired attitude relative to the body, clamping the axle beam to the flanges and drilling aligned holes through the flanges and axle beam to accept the axle attaching bolt.

* * * * *